Nov. 2, 1965     W. SCHMIDT     3,215,371
DRIVING ARRANGEMENT FOR LAND-, WATER- AND AIRCRAFT
Filed Oct. 10, 1963     6 Sheets-Sheet 1

INVENTOR.
Wilhelm Schmidt
BY
Michael S. Stricker
his ATTORNEY

Nov. 2, 1965 W. SCHMIDT 3,215,371
DRIVING ARRANGEMENT FOR LAND-, WATER- AND AIRCRAFT
Filed Oct. 10, 1963 6 Sheets-Sheet 4

INVENTOR:
WILHELM SCHMIDT
BY Michael S. Striker

Nov. 2, 1965                    W. SCHMIDT                    3,215,371
                DRIVING ARRANGEMENT FOR LAND-, WATER- AND AIRCRAFT
Filed Oct. 10, 1963                                      6 Sheets-Sheet 6

INVENTOR:
WILHELM SCHMIDT
BY Michael S. Striker

ATTORNEY 3,215,371
DRIVING ARRANGEMENT FOR LAND-,
WATER- AND AIRCRAFT
Wilhelm Schmidt, Bischofswerder Strasse 3,
Dresden, Germany
Filed Oct. 10, 1963, Ser. No. 315,276
51 Claims. (Cl. 244—62)

This is a continuation-in-part of my application Ser. No. 48,231, filed Aug. 8, 1960, now U.S. Patent No. 3,111,928, granted Nov. 26, 1963.

The present invention relates to a driving arrangement for land-, water- and aircraft of the type propelled in a fluid medium by at least one fluid stream which moves with respect to the fluid medium to produce a propulsive thrust. More particularly, the invention relates to a driving arrangement which constitutes an improvement over and a further development of the driving arrangement disclosed in my U.S. Patent No. 3,068,642, granted Dec. 18, 1962.

A fluid stream is normally produced by the propeller of an airplane, by a jet power plant for airplanes, sleds, automobiles and rockets, or by the propeller of a watercraft. Propulsive thrust develops as a result of the difference between the speed of the fluid stream and the forward speed of the conveyance. Such thrust increases with increasing cross-sectional area of the fluid stream and with increasing difference between the aforementioned speeds. The efficiency of and the suppression of noise in such arrangements will improve if the difference between the speed of the fluid stream and the forward speed of the conveyance decreases, and it is normally desirable to produce a fluid stream of comparatively small cross-sectional area without reducing the propulsive thrust. According to certain prior proposals which are based on the well-known Knoller-Betz or Katzmayr effect, higher efficiency of driving arrangements which operate with a fluid stream may be achieved by placing into the fluid stream a suitably profiled body and by causing the fluid stream to impinge thereagainst. See "The Knoller-Betz Effect as a Means to Increase the Efficiency of Flapping Wings," by Schmidt and Reichstein, Jahrbuch 1942 der Deutschen Luftfahrtforschung, pages I 432–I 434. For example, it was already proposed to deflect the fluid stream alternatively against different portions of a profiled body by a device revolving about an axis which is parallel with the direction of fluid flow. However, such arrangements cause the fluid stream to spin which produces an adverse effect on the thrust of the driving arrangement.

Accordingly, it is an important object of my present invention to provide an improved driving arrangement for land-, water- and aircraft which is also based to some extent on the Knoller-Betz or Katzmayr effect and wherein the deflection of the fluid stream against a profiled body may be brought about in such a way that no spinning of the fluid stream takes place during the deflection.

Another object of the invention is to provide a driving arrangement which is of extremely simple construction and which is capable of producing a satisfactory propulsive thrust even if the profiled body which was heretofore considered necessary to operate on the basis of the Katzmayr effect is dispensed with.

A further object of the invention is to provide a driving arrangement which is capable of deflecting the fluid stream at very high frequency and in which the deflecting means and the profiled body may be adjusted in all directions not only with reference to each other but also with reference to the fluid stream.

An additional object of the instant invention is to provide a driving arrangement which combines the lift producing and propulsion generating means of a conveyance into a unitary structure.

A further object of my invention is to provide a driving arrangement which combines the lift producing, the propulsion generating and the direction controlling means of a conveyance into a compact unitary structure.

Another important object of my invention is to provide a novel method of driving a conveyance by means of one or more fluid streams.

Still another object of the invention is to provide a driving arrangement of the above outlined characteristics which may be utilized in many presently known conveyances of the type propelled in a fluid medium by one or more fluid streams without necessitating substantial changes in the design of such conveyances.

An additional object of the invention is to provide a driving arrangement of the above described type which is of lightweight construction, which is constructed and assembled in such a way that it can perform one or more additional functions including assisting during takeoff (starting) or landing (docking) which exerts a beneficial influence on the flow of air or water along the wing or wings of a winged conveyance by reducing the resistance which the wings offer to the flow of air or water therealong, and which improves the lift action of the wings.

Another object of the invention is to provide a driving arrangement which reduces the noise in jet propelled aircraft, whose jet efficiency is higher than the efficiency of heretofore known jet propulsion systems of which I am aware at this time, which reduces the likelihood of roll in an aircraft, and which produces low-speed fluid streams resulting in less noise and in higher efficiency of the conveyance in which the driving arrangement is installed.

With the above objects in view, one feature of my invention resides in the provision of a driving arrangement for winged or foil-supported conveyances, particularly for aircraft, for road vehicles including jet-propelled vehicles such as sleds and automobiles, and for watercraft of all kinds including those known as hydrofoil craft. The driving arrangement may comprise one or more power plants arranged to produce one or more preferably low-speed fluid streams and mounted close to or in the wing or wings so as to form a compact and preferably unitary lift producing and propulsion generating means, undulator means of airfoil profile disposed at the downstream side of the orifice or orifices of nozzles through which the fluid streams are discharged from one or more power plants and arranged to orbit in and to thereby undulate (i.e., impart the form of waves to) the fluid streams, and one or more deundulator means of airfoil profile located in the undulated fluid stream or streams so that the fluid streams alternatively impinge against the opposed sides of and are thereby "deundulated" or straightened by the deundulator means to increase the propulsive thrust of the driving arrangement. Means is provided to orbit the undulator means at constant speed or at variable speed so as to deflect the fluid stream or streams at a predetermined frequency, and the driving arrangement may further comprise means for changing the position of the entire or of selected portions of the deundulator means so as to change the ultimate direction of the originally undulated and subsequently deundulated fluid stream or streams in order to assist the conveyance in landing or during takeoff. The exhaust nozzles of the power plants are preferably provided in or near the trailing edges of the wings or foils.

In accordance with another feature of my invention, the undulator means by itself constitutes an operative driving arrangement if it is combined with a motor or the like which is capable of causing the undulator means to orbit or to perform in a fluid medium an analogous movement necessary to produce one or more undulated fluid streams. Furthermore, the undulator means and the deundulator means together form a very satisfactory driving arrangement which may be used in many types of conveyances without necessitating the provision of additional stream producing means, such as propellers, jet power plants or the like.

The method of my invention comprises the steps of producing in a fluid medium (air or water) an undulated fluid stream and of causing the undulated fluid stream to flow in a direction counter to the direction of intended propulsion. The propulsive thrust of the driving arrangement is improved if the undulated stream is thereupon deundulated by impinging alternatively against the opposed sides of a profiled deundulator. The propulsive thrust may be increased still further if the method comprises the initial step of forming a substantially straight fluid stream which flows in the fluid medium in a predetermined direction counter to the direction of intended propulsion, if the straight fluid stream is thereupon undulated by a body of airfoil profile which is caused to orbit in the straight fluid stream about an axis which is perpendicular to the direction of the straight fluid stream, and if the resulting undulated fluid stream is thereupon deundulated by a second body of airfoil profile which is placed into the undulated fluid stream in such a way that its sides are alternatively in the path of the undulated fluid stream whereby the stream is deundulated and the propulsive thrust of the driving arrangement increases.

Thus, the method can be carried out by using an undulator alone and by providing means which causes the undulator to perform in fluid medium movements necessary to produce an undulated fluid stream which flows in a direction counter to the direction of intended propulsion, by combining the undulator with one or more deundulators and/or by combining the undulator with one or more propellers, jet power plants or other means capable of producing one or more straight fluid streams which are thereupon undulated to increase the propulsive thrust and which might be deundulated to further increase the thrust.

The novel features which are considered as characteristic of the invention are set forth in particular in the appended claims. The improved driving arrangement itself, however, both as to its construction and its method of operation, together with additional features and advantages thereof, will be best understood from the following detailed description of certain specific embodiments with reference to the accompanying drawings, in which:

Figure 1:
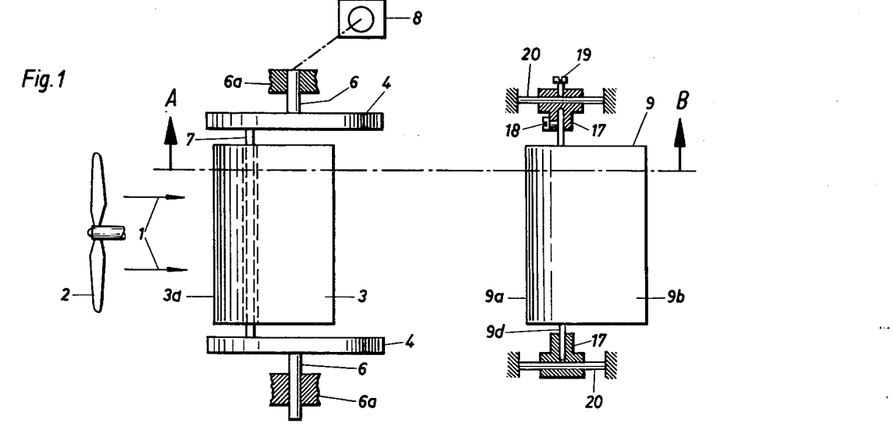
FIG. 1 is a schematic top plan view of a driving arrangement which embodies one form of my invention.
Figure 2:
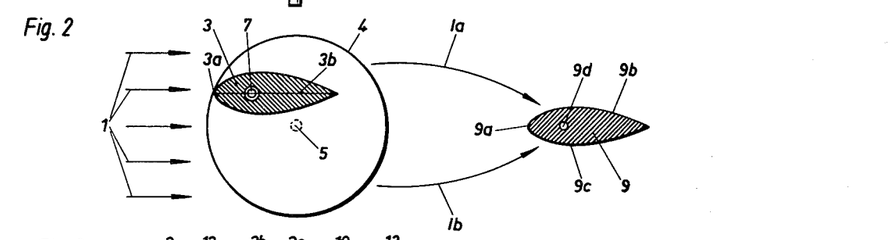
FIG. 2 is a section taken along the line A–B of FIG. 1, as seen in the direction of arrows.

Referring first to FIGS. 1 and 2, there is shown a driving arrangement which may be utilized in a land-, water- or aircraft of the type propelled in a fluid medium (air or water) by at least one fluid stream which moves with respect to the fluid medium. The means for producing an air stream or a water stream 1 comprises a propeller 2. The driving arrangement further comprises a waving member or undulator 3 which is of airfoil profile (see FIG. 2) and which is rotatable about the axis of a shaft 7. The axis of the shaft 7 is perpendicular to the direction of the fluid stream 1 and is eccentric with reference to the common axis of two disk-shaped drive members 4 which form part of a rotary drive means for supporting and for orbiting the undulator 3 in the fluid stream. The coaxial shafts 6 of the disk-shaped drive members 4 are mounted in journal bearings 6a, and one of the shafts 6 is rotated by a suitable power plant, e.g., by an electric motor 8. The planes of rotary disk-shaped drive members 4 are parallel with the transverse cross-sectional plane of the undulator 3 which passes through the line A–B.

As shown in FIGS. 1 and 2, the fluid stream 1 which is produced by the propeller 2 is straight and flows in a predetermined direction which is perpendicular to the leading edge 3a of the undulator 3 and which is counter to the direction of propulsion of the vehicle in which the driving arrangement is put to use. The common axis 5 of the shafts 6 about which the disk-shaped drive members 4 rotate is also perpendicular to the direction of the fluid stream 1 and, when the undulator 3 orbits in response to rotation of the disk-shaped drive members, it alternatively deflects the originally straight fluid stream in directions indicated by the arrows 1a, 1b so that the stream flows against the opposed sides of a profiled body 9 (hereinafter called deundulator or straightening member) which preferably assumes the shape of an airfoil and which is mounted downstream of the undulator 3, as seen in the direction of fluid flow, in such a manner that its leading edge 9a is perpendicular to the direction of the fluid stream. The surfaces at the opposed sides of the deundulator 9 are identified by reference numerals 9b and 9c. These surfaces are substantially parallel with the original direction of the fluid stream 1.

The deundulator 9 is rigidly secured to a carrier shaft 9d which is parallel with the leading edge 9a of the deundulator. The end portions of the carrier shaft 9d are rotatably mounted in substantially T-shaped bearings 17 and may be fixed in any of a number of angular positions with reference to the axis of the carrier shaft 9d by means of a retaining screw 18 or the like. The bearings 17 are slidable along two parallel guide rods 20 and at least one thereof may be releasably fixed to the respective guide rod by a retaining screw 19 or a similar fastener. The rods 20 and the bearings 17 allow for adjustments in the position of the deundulator 9 in the direction of fluid flow, i.e., toward and away from the undulator 3 (see the phantom-line position 9' in FIG. 3). By loosening the retaining screw 18, the deundulator 9 may be rocked into and beyond the phantom-line positions 9'', 9''', of FIG. 3 to vary the angle of impact between the fluid streams flowing in the directions 1a, 1b and the surfaces 9b, 9c, respectively.

Figure 2A:
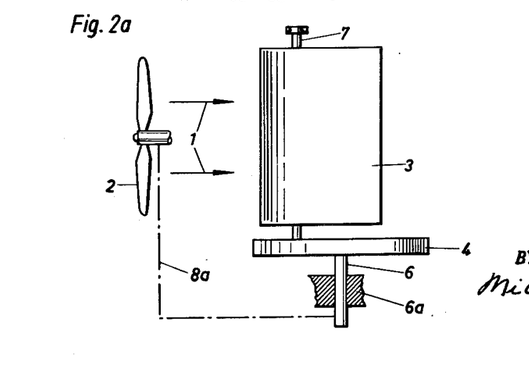
FIG. 2a is a fragmentary top plan view of a detail constituting a modification of the driving arrangement which is shown in FIGS. 1 and 2.

Referring to FIG. 2a, it will be noted that the rotary drive means comprises a single disk-shaped drive member 4 and that this disk-shaped drive member is rotated by the propeller 2. The operative connection between the propeller 2 and the shaft 6 of the disk-shaped drive member 4 is shown schematically by a phantom line 8a.

When the driving arrangement of FIGS. 1–2 or FIG. 2a is in actual use, the disk-shaped drive member of members 4 will cause the undulator 3 to perform an orbiting movement and to remain parallel with itself by moving in directions perpendicular to the direction of the fluid stream 1 whereby the fluid stream is alternatively deflected in directions indicated by the arrows 1a, 1b and respectively impinges against the surfaces 9b, 9c of the deundulator 9. During such orbiting movement, the undulator 3 normally remains in parallelism with itself either because it is rotatable about its shaft 7 and because the axis of the shaft 7 is located in the geometric chord 3b of the undulator 3, or the undulator may be positively held in such position by means which will be described in greater detail in connection with FIG. 3. The disk-shaped drive member or members 4 normally rotate at a constant speed so that the undulator 3 transforms the straight fluid stream 1 into an undulated fluid stream and directs the undulated stream alternatively against the surfaces 9b, 9c at a predetermined frequency. Such undulation of the fluid stream 1 brings about the aforementioned Knoller-Betz or Katzmayr effect resulting in greater efficiency and increased propulsive thrust of the driving arrangement.

It is preferred to mount the undulator 3 in such a way that the axis of the shaft 7 is located in the point of attack of the force produced by the fluid stream 1, i.e., in the aerodynamic or hydrodynamic center, because such mounting insures that the undulator automatically remains parallel with itself when it is caused to orbit in response to rotation of the disk-shaped member or members 4.

Figure 3:
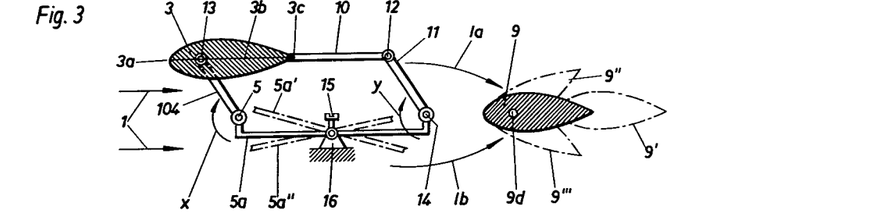
FIG. 3 is a partial elevational and partial sectional view of a third driving arrangement.

Referring now to FIG. 3, there is shown an assembly which positively holds the undulator 3 in a position of parallelism with itself when the undulator performs an orbiting movement. The rotary drive means of FIG. 3 comprises a link 104 which rotates about a pivot 5 provided at the forward end of a two-armed lever 5a. The other end of the link 104 is connected with a shaft 13 which supports the undulator 3 whose axis of rotation is again located in the geometric chord 3b. The trailing edge 3c of the undulator is connected with the forward end of a connecting rod 10 which is rockable about a pivot 12 provided at the free end of a second link-shaped rotary drive means 11, the latter being rotatable about a pivot 14 provided at the rear end of the lever 5a. As the rotary drive means 104, 11 rotate about their respective pivots 5, 14, the connecting rod 10 holds the undulator 3 in a position of parallelism with itself so that the undulator alternatively deflects a straight fluid stream 1 in directions indicated by the arrows 1a, 1b whereby the fluid stream impinges against the opposed sides of the deundulator 9. The deundulator 9 may be moved toward, into and beyond the phantom-line position 9', and the deundulator is also pivotable between and beyond the phantom-line positions 9'', 9'''.

The undulator 3 and the connecting rod 10, the lever 5a, the front rotary drive means 104, and the rear rotary drive means 11 constitute the four links of a deformable parallel motion mechanism in which the composite link 3, 10 is always parallel with the lever or link 5a. As shown, the median portion of the two-armed lever 5a is rockably mounted in a bearing bracket 16 and may be fixed in any of a number of angular positions by a retaining screw 15 or the like so that the undulator 3 is shiftable transversely with reference to the direction of the fluid stream into a number of different positions. For example, the lever 5a may be rocked between and beyond the phantom-line positions 5a', 5a''. The directions in which the links 104, 11 rotate are indicated by arrows X, Y, respectively. Furthermore, the lever 5a may be shifted in the axial direction of its bearing 16 so that the position of the undulator 3 may be simultaneously or selectively adjusted in directions parallel and/or transverse to the direction of the fluid stream. Axial adjustments of the lever 5a will cause the undulator 3 to move nearer to or further away from the deundulator 9. Furthermore, any changes in the angular position of the lever 5a will bring about changes in the angular position of the undulator 3 with reference to the direction of the fluid stream.

It will be readily understood that the fluid stream 1 may be produced by means other than the propeller 2. Thus, if the driving arrangement is installed in a craft which is propelled by a jet engine or the like in a manner shown in FIGS. 4 to 7, the undulator 3 is placed downstream of the exhaust nozzle. In a watercraft, the undulator may be located in water downstream of the propeller.

Figure 4:
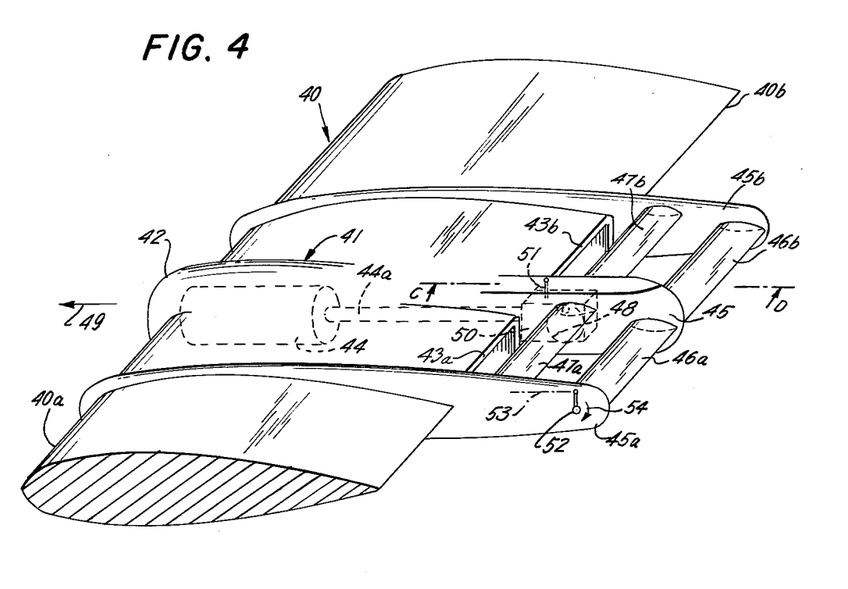
FIG. 4 is a fragmentary perspective view of a wing and of a driving arrangement which is mounted partially in the interior of and partially behind the trailing edge of the wing.

Referring to FIG. 4, there is shown an airplane wing 40 which accommodates or is integral with the nacelle of a power plant 41, e.g., a jet power plant. The air intake 42 and the exit nozzles 43a, 43b of the power plant 41 are respectively located at the leading and trailing edges 40a, 40b of the wing 40. The slit-shaped orifices of the nozzles 43a, 43b are of elongated rectangular shape and extend in the longitudinal direction of the trailing edge 40b. The compressor 44 of the power plant 41 comprises a shaft 44a which extends rearwardly into a central supporting member or carrier 45, the latter projecting rearwardly from and beyond the trailing edge 40b. This central carrier 45 cooperates with a pair of spaced lateral supporting members or carriers 45a, 45b to support two aligned bodies 46a, 46b of streamlined profile, these streamlined bodies (hereinafter called straightening members or deundulators) being located at the downstream side of and in the path of straight fluid streams respectively discharged through the orifices of the nozzles 43a, 43b. The deundulators 46a, 46b are spaced from and are located rearwardly of the respective nozzles so as to provide room for deflecting means in the form of two aligned waving members or undulators 47a, 47b of streamlined profile which are respectively mounted between the central carrier 45 and the lateral carriers 45a, 45b so as to orbit in parallelism with themselves along the periphery of a circle 48 which is shown in broken lines. It will be noted that the undulators 47a, 47b are located in the path of the fluid streams respectively flowing through the orifices of the nozzles 43a, 43b toward the deundulators 46a, 46b and their purpose is to undulate and to alternatively deflect the fluid streams from a direction parallel with but counter to the direction of propulsion (indicated by the arrow 49) and against the substantially opposed upper and lower sides of the respective deundulators. This brings about the aforementioned Knoller-Betz or Katzmayr effect and improves the propulsive thrust of the driving arrangement which latter comprises the power plant 41, the undulators 47a, 47b and the deundulators 46a, 46b.

Figure 5:
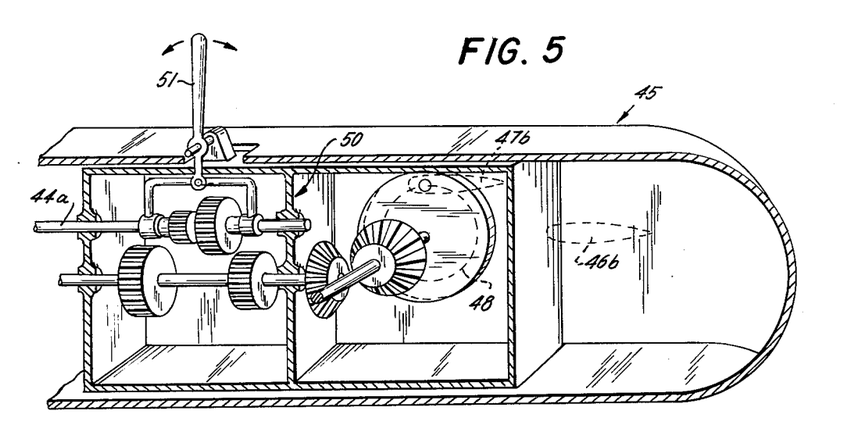
FIG. 5 is an enlarged fragmentary section as seen in the direction of arrows from the line C–D of FIG. 4.

The means for orbiting the undulators 47a, 47b in the endless path indicated by the circle 48 (whose axis is perpendicular to the direction of fluid streams discharged through the orifices of the nozzles 43a, 43b) comprises a suitable transmission 50, shown in more detail in FIG. 5, which is driven by the compressor shaft 44a and whose exact construction forms no part of the present invention. Any transmission which can transform rotary movement of the shaft 44a into requisite orbiting movement of the undulators 47a, 47b can be utilized in the construction of FIG. 4, as long as the undulators 47a, 47b can alternatively deflect the respective fluid streams against the opposed sides of the deundulators 46a, 46b. It is preferred to utilize a transmission of the variable speed type and to provide means (schematically indicated by a lever 51) for changing the speed ratio of the transmission by remote control so that the pilot of the craft of which the wing 40 forms a component part may control the frequency at which the fluid streams are deflected by the undulators 47a, 47b.

As shown in FIG. 4, the lateral carriers 45a, 45b extend along the upper side and along the underside of the wing 40 so as to constitute barriers for the boundary layer whereby the boundary layer cannot interfere or interferes less with the propulsive action of the driving arrangement. The driving arrangement preferably embodies one or more power plants of the type which produce low-speed (subsonic speed) fluid streams, i.e., fluid streams whose speed approximates or does not substantially exceed the forward speed of the aircraft, in contrast to power plants for generation of fluid streams whose speed exceeds two or three times the forward speed of the conveyance in which they are put to use.

The deundulators 46a, 46b are normally in the position of FIG. 4 in which they deundulate and thereby restore the original direction of the respective fluid streams. However, in order to enable the deundulators 46a, 46b to serve as rudders or landing flaps, they are turnably mounted on aligned shafts 52 (only one shown in FIG. 4) and are adjustable angularly by remote control means indicated schematically by the phantom line 53 so as to brake or to steer the aircraft when turned in the direction of the arrow 54. It is also possible to utilize the deundulators as a means for assisting the takeoff of an aircraft. The common axis of the shafts 52 is parallel with the common axis of the undulators 47a, 47b.

The driving arrangement of FIGS. 4 and 5 operates as follows:

The fluid stream produced by the power plant 41 is divided into two streams which are respectively discharged through the orifices of the nozzles 43a, 43b, and these streams are thereupon undulated by the orbiting undulators 47a, 47b so as to alternatively impinge against the upper sides and against the undersides of the respective deundulators 46a, 46b which are assumed to be in the position of FIG. 4. The resultant propulsive thrust is greater than the propulsive thrust of a driving arrangement without the undulators. It is assumed that the speed of the fluid streams does not substantially exceed the speed of the aircraft.

The undulation of the fluid streams by the undulators 47a, 47b by itself produces a propulsive thrust. Additional propulsive thrust is produced on the profiled deundulators 46a, 46b owing to the fact that the undulated fluid streams alternatively impinge against the opposed sides of these deundulators. In addition, the fluid streams discharged through the nozzles 43a, 43b which are mounted in the wing 40 suck the boundary layer of the fluid streaming along the sides of the wing between the lateral carriers 45a, 45b, and such sucking action of the fluid streams is assisted by the undulators 47a, 47b. This improves the lifting action of the wing 40. It will be noted that the driving arrangement of FIGS. 4 and 5 is assembled in such a way that the means for producing a propulsive thrust and the means for producing a lifting force are combined into a compact unitary structure.

In accordance with a slight modification of the structure which is shown in FIG. 4, the deundulators 46a, 46b may be adjusted angularly about an axis which coincides with the axis of the circle 48 to assist the aircraft during landing or takeoff if the deundulators are swung to a position in which they change the direction of the deundulated fluid streams so that the deundulated streams make a certain angle with the original direction thereof. In such constructions, the shafts 52 and the control means 53 must be replaced by another system which permits the deundulators to travel in an arc about the axis of the circle 48, i.e., about the axis around which the undulators 47a, 47b are caused to orbit by the transmission 50.

Figures 6, 7, 8:
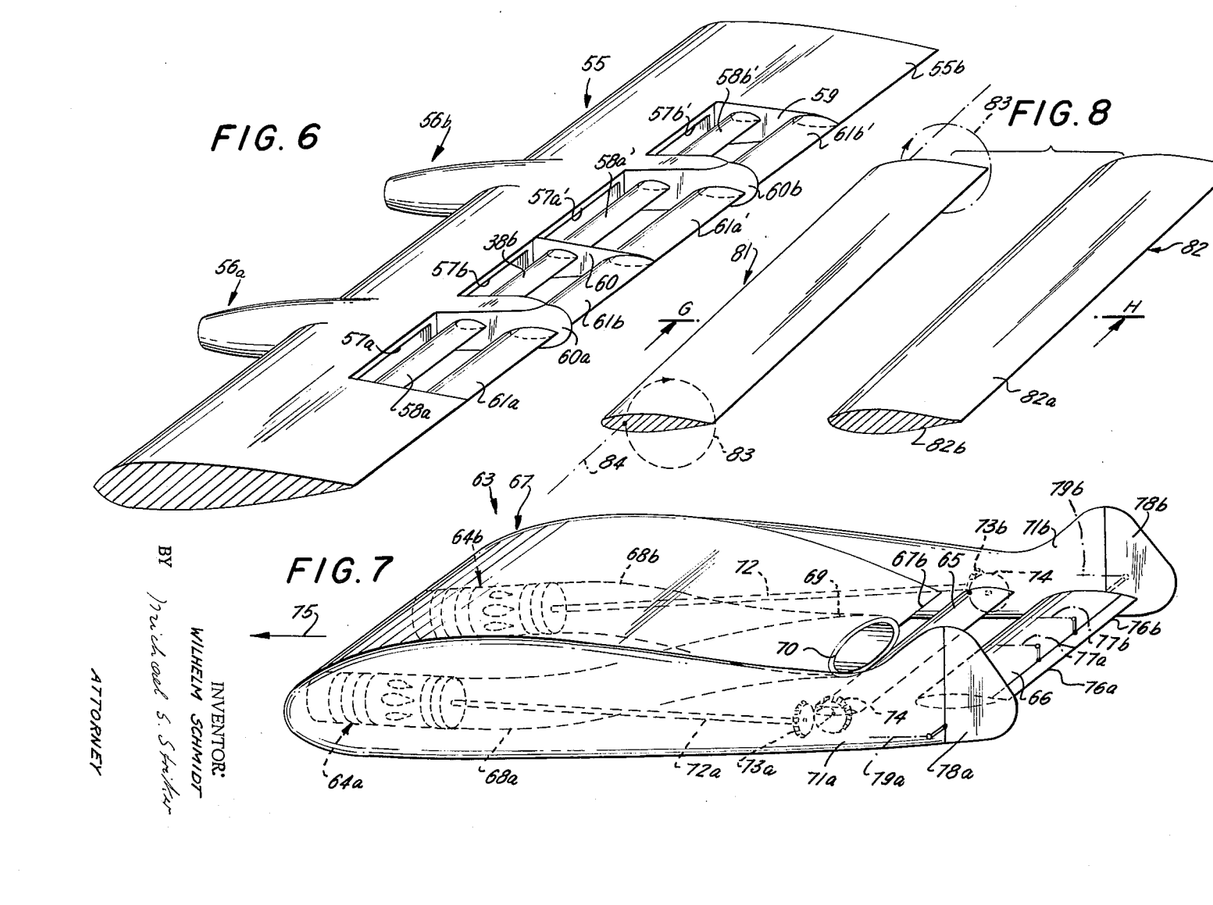
FIG. 6 is a somewhat schematic fragmentary perspective view of a wing and of a twin driving arrangement which is mounted almost entirely within the confines of the wing.
FIG. 7 is a perspective view of a land- or watercraft which embodies two jet power plants and a single driving arrangement, the latter being combined with means for facilitating directional control of the craft.
FIG. 8 is a diagrammatic perspective view of a simplified driving arrangement which operates without a propeller or jet power plant.

FIG. 6 illustrates a twin driving arrangement which is built entirely into the wing 55 of an aircraft. This twin driving arrangement comprises two spaced jet power plants 56a, 56b each of which comprises two substantially rectangular exhaust nozzles 57a, 57b and 57a', 57b', respectively. The undulators 58a, 58b for the nozzles 57a, 57b and the undulators 58a', 58b' for the nozzles 57a', 57b' are accommodated in a rectangular recess 59 of the wing 55 which recess extends forwardly from the trailing edge 55b. The undulators 58a, 58b and 58a', 58b' are respectively separated by lateral supporting members or carriers 60a, 60b and the undulators 58b, 58a' are separated by a central carrier 60, all these carriers being accommodated in the recess 59. The construction of the dual means, installed in the carriers 60a, 60b and driven by the compressors of the power plants 56a, 56b, for orbiting the undulators in parallelism with themselves is analogous to that of the transmission 50 shown in FIGS. 4 and 5 and, therefore, need not be shown in FIG. 6. The orbiting undulators 58a, 58b, 58a' 58b' respectively undulate the individual fluid streams which are discharged through the orifices of the nozzles 57a, 57b, 57a' 57b' and direct the undulated fluid streams alternatively against the upper sides and against the undersides of four deundulators 61a, 61b, 61a', 61b' which latter are mounted entirely within the confines of the recess 59 and are supported partly by the wing 55 and partly by the carriers 60, 60a, 60b. The operation of this modified driving arrangement is analogous to that of the arrangement which is shown in FIGS. 4 and 5, i.e., it also takes advantage of the Knoller-Betz or Katzmayr effect and its propulsive thrust is greater than the propulsive thrust of a driving arrangement which includes only one or more jet power plants without any deundulating and/or undulating means.

It will be readily understood that the wing 55 may accommodate more than two power plants so that the exhaust nozzles of the power plants may have orifices in the form of elongated slits which extend along a substantial part of or even along the entire trailing edge 55b. Furthermore, if desired, each of the nozzles 57a, 57b, 57a', 57b' may be subdivided into two or more shorter nozzles each of which may direct a fluid stream against a separate undulator, or two or more such shorter nozzles may direct fluid streams against a common undulator. The number of deundulators normally does but need not necessarily equal the number of the undulators, i.e., it is possible to replace the deundulators 61a, 61b, 61a', 61b' by two or even by a single deundulator.

Of course, the other wing of the aircraft which embodies the structure of FIG. 4 or 6 is also equipped with one, two or more driving arrangements. Thus, the aircraft of which the wing 55 forms a component part is provided with two additional driving arrangements which are mounted in the other wing. By providing two or more power plants for each wing, the likelihood that the aircraft would tend to tilt about its longitudinal axis (roll) is reduced considerably even in the event that one or more power plants would fail to operate in the required manner. Furthermore, and particularly if the power plant as well as the undulating and deundulating means are mounted within the confines of the wing as shown in FIG. 6, the weight of the driving arrangement may be further reduced and any shifting of the center of gravity of a so-constructed wing or foil is avoided in a very simple way.

If the profiled deundulator or deundulators are adjustable angularly with respect to the wing or foil in a manner as described in connection with FIG. 4, they may serve as the sole or as auxiliary landing or control flaps and will brake the aircraft during landing. In the nonillustrated angularly displaced position (arrow 54), the deundulators 46a, 46b will act as landing flaps.

As stated hereinabove, the driving arrangement of FIGS. 4 to 6 is equally useful in certain conveyances other than aircraft, e.g., in jet propelled automobiles, in jet propelled sleds, or in hydrofoils and other types of watercraft. The efficiency and stability of a hydrofoil having foils provided with one or more driving arrangements of my invention are higher than in presently known hydrofoils of which I am aware at this time.

FIG. 7 illustrates a jet-propelled land vehicle 63 which is assumed to constitute a sled and which comprises a modified driving arrangement including two jet power plants 64a, 64b, a single undulator 65, and a single deundulator 66. The power plants 64a, 64b are mounted in spaced relation at the lending edge of a streamlined body or wing 67 and discharge their combustion products in the form of two individual fluid streams which pass through conduits 68a, 68b and into a single collecting conduit 69 leading to a single, somewhat flattened (e.g., substantially oval) exhaust nozzle 70 which is forwardly adjacent to the undulator 65, the latter being mounted between two spaced rearwardly extending carriers or fins 71a, 71b of the wing 67. The carriers 71a, 71b also support the deundulator 66. It will be noted that the longitudinal end portions of the members 65, 66 extend laterally of and beyond the orifice of the nozzle 70.

The means for orbiting the undulator 65 in parallelism with itself comprises two compressor shafts 72a, 72b which respectively drive two variable-speed transmissions 73a, 73b so that the latter may move the undulator in parallelism with itself in a path indicated by circles 74. The transmissions 73a, 73b may comprise trains of bevel gears and spur gears or the like.

The nozzle 70 is located in the trailing edge 67b of the wing 67 and its orifice directs the single fluid stream against the orbiting undulator 65 which alternatively deflects the fluid stream against the upper side and against the underside of the deundulator 66 so that the latter restores the original direction of the fluid stream and the vehicle 63 is advanced in a direction indicated by the arrow 75.

The rear end portion of the deundulator 66, i.e., the portion adjacent ot the trailing edge thereof, is movable with respect to the main body portion of the deundulator and constitutes a part of the steering means for the conveyance. This rear end portion comprises two relatively movable elevators or ailerons 67a, 76b which are swingable about a transverse axis and are respectively movable by schematically indicated remote control means 77a, 77b.

The rear end portions of the fins 71a, 71b respectively constitute two side rudders 78a, 78b and are swingable about vertical axes by remote control means 79a, 79b respectively.

The compartments for the passengers and pilots of the vehicle 63 are not shown because they form no part of the present invention.

In certain of the appended claims, the expression "wing" is intended to embrace the wing of an aircraft, the wing or foil of a hydrofoil, and the streamlined body or chassis of a jet propelled land vehicle including sleds, automobiles and the like.

It will be noted that the driving arrangement of my invention may comprise a single power plant which is combined with a plurality of undulating and deundulating means (FIG. 4), a plurality of power plants combined with a single undulating means and a single deundulating means (FIG. 7), that the fluid stream produced by a single power plant may be divided into a plurality of streams (FIG. 4), or that the individual streams produced by a plurality of power plants may be combined into a single fluid stream (FIG. 7).

In accordance with a further feature of my invention, the deundulator, the undulator and the means for causing this undulator to produce an undulated fluid stream by themselves constitute an operative driving arrangement. In other words, and referring to FIGS. 1 to 7, the propellers and the jet power plants may be dispensed with (at least in certain types of conveyances) and the remainder of the driving arrangement is still capable of producing a propulsive thrust which will drive a land-, water- or aircraft. In fact, it is even possible to omit the deundulator and to construct the driving arrangement in such a way that it merely comprises an undulator and means for causing the undulator to produce an undulated fluid stream. This has been determined with actual models of the driving arrangement and the results fully justify the conclusion that the undulator alone (with the means for causing it to perform a movement which is necessary to produce an undulated fluid stream) or the combination of the undulator with a deundulator by itself constitutes an effective driving arrangement. My experiments have also shown that the propulsive thrust of the driving arrangement is improved if one or more undulators are combined with one or more deundulators. Furthermore, the results of experiments with actual models have shown that a small adjustment in the inclination of the undulator with reference to the direction of the fluid stream will result in substantial deflection of the fluid stream. The adjustment is negative if the fluid stream is to flow toward the rear, and the adjustment will be positive if the fluid stream is to be deflected in downward direction.

The provision of means for producing a fluid stream (such as the propeller 2 or the jet power plant 41) is advisable in certain conveyances in order to facilitate proper take off of the vehicle, i.e., to produce an initial propulsive thrust. Such fluid stream producing means is of advantage in vehicles (particularly aircraft and sleds) which are normally started by a fluid stream. On the other hand, a flying automobile can be started by means of conventional drive which rotates its wheels until the automobile gains a certain speed, whereupon the driver couples the engine or engines with a driving arrangement which is constructed in accordance with the present invention and which includes an undulator with means for orbiting the same and eventually a deundulator. Once the automobile travels at a certain speed, the undulator is automatically located in a fluid stream because the automobile moves with respect to the air. In other words, the undulator may be put to use once the automobile is in motion at a given speed so that the relative speed between the automobile and the air reaches a desired magnitude, whereupon the engine is coupled to the undulator which begins to orbit or to perform another movement necessary to produce an undulated fluid stream which may be directed against the opposed sides of one or more deundulators.

The situation is similar if the driving arrangement of my invention is used in a watercraft of the type having a foil which is normally located above the level of the water surface. The watercraft is started with the help of one or more propellers and the driver shifts to operation with the driving arrangement when the craft has gained a certain speed so that the relative movement between the craft and the air or water has attained a desired magnitude. Thus, here again, the undulator will take over once the craft is in motion and once the craft automatically produces a fluid stream which is ready to be undulated by the undulator to produce a propulsive thrust with or without the assistance by a deundulator. A driving arrangement without a deundulator has been found to be satisfactory for miniature boats in shallow waters, and such elementary form of driving arrangement is equally useful as an auxiliary power plant for sailboats and gliders. The auxiliary power plant is put to use only when the glider or the sailboat cannot find a satisfactory air current to reach its destination.

Referring to FIG. 8, there is shown one form of a simplified driving arrangement which comprises an undulator 81 of airfoil profile, a deundulator 82 of airfoil profile which is located downstream of the undulator, and means (not shown) which serves to orbit the undulator along the peripheries of circles 83 so that the undulator alternatively deflects an undulated fluid stream against the opposed sides 82a, 82b of the deundulator 82. There is no need for a propeller or for a jet power plant because the orbiting undulator will automatically produce an undulated fluid stream (be it a gas stream or a liquid stream) which is directed against the deundulator and whose propulsive thrust is increased upon contact with the sides 82a, 82b of the deundulator so that the driving arrangement may serve as a means for propelling, a land- water- or aircraft in a manner to be described in connection with FIGS. 9 to 13. While orbiting along the peripheries of the circles 83, the undulator 81 remains parallel with itself because it rotates about the axis 84. The means for orbiting the undulator 81 is analogous to the means shown in FIGS. 1 and 2 or in FIG. 3.

As stated hereinabove, the efficiency of the driving arrangement which is shown in FIG. 8 will be reduced if the deundulator 82 is omitted because the propulsive thrust improves when the fluid stream impinges against the opposed sides of the deundulator. Nevertheless, the undulator 81 and the orbiting means therefor by themselves constitute an operative driving arrangement which may be used in certain types of conveyances, e.g., as an auxiliary power plant in gliders and sailboats.

Figure 9:
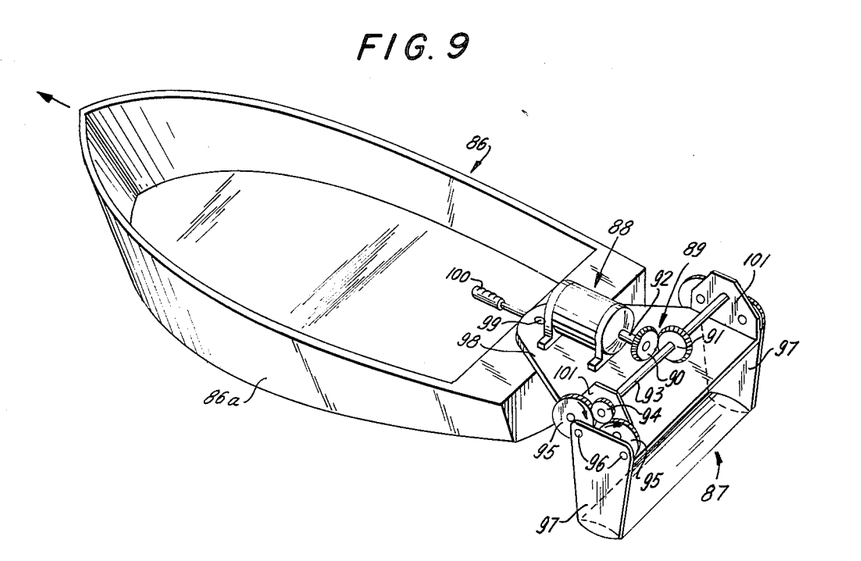
FIG. 9 is a perspective view of a boat which is equipped with an elementary driving arrangement including a single outboard undulator which is not combined with a deundulator.

FIG. 9 illustrates a watercraft in the form of a flat boat 86 which is propelled by an underwater outboard undulator 87. The means for orbiting the undulator 87 comprises a power plant 88 (e.g., an internal combustion engine) which drives a step-down transmission (gear reducer) 89 including a pair of meshing bevel gears 90, 91 on shafts 92, 93, respectively, a pair of spur gears 94 mounted on the shaft 93, two pairs of spur gears 95 each meshing with one of the gears 94, and eccentric pins 96 mounted on the gears 95 and secured to upwardly extending end portions or lugs 97 of the undulator 87. The undulator 87 is of airfoil profile and its leading edge extends transversely of the hull 86a. The engine 88 and the transmission 89 are mounted on a supporting means here shown as a platform 98 which is located astern of the hull 86a and which is turnable about a vertical pivot 99 to provide for steering of the boat. The platform 98 may be turned by means of a handgrip member 100. The shaft 93 and the gears 94, 95 are mounted in two bearing brackets 101 which are carried by the platform 98. One of the gears 94 and one pair of gears 95 are partially concealed behind the rear bracket 101.

The undulator 87 must extend only slightly below the level of the water surface so that the boat 86 may be used in very shallow waters. It goes without saying that the undulator 87 may be combined with a deundulator which is located downstream of the platform 98 and in the path of the undulated water stream which is produced when the undulator 87 orbits in response to rotation of the gear train 90, 91, 94, 95.

Figure 10:
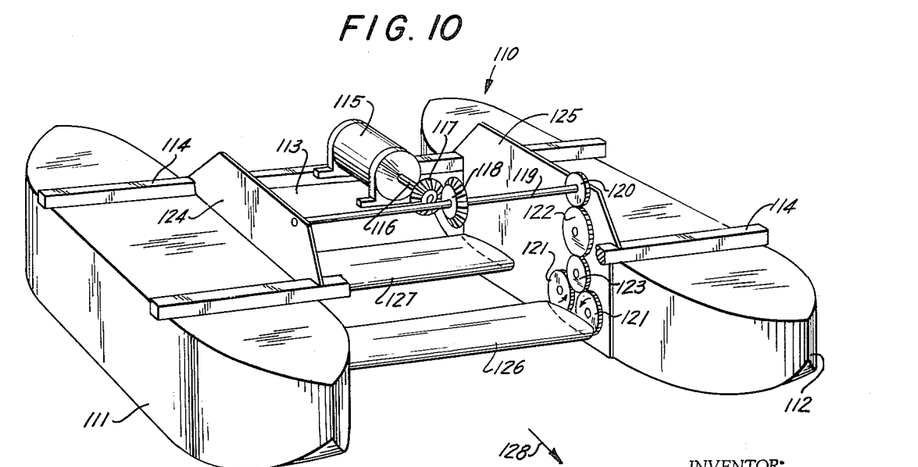
FIG. 10 is a perspective view of a twin-hulled watercraft which is equipped with a driving arrangement of the type shown in FIG. 8.

FIG. 10 illustrates another watercraft which assumes the form of a catamaran 110 with twin hulls 111, 112 connected by a horizontal platform 113 which is reinforced by a series of beams 114. The platform 113 supports an internal combustion engine 115 whose output shaft 116 drives a transmission including a pair of bevel gears 117, 118, a shaft 119 driven by the bevel gear 118 and connected with two spur gears 120 which drive pairs of spur gears 121 through intermediate gears 122, 123. Certain of these gears are concealed by a bearing bracket 124 which is fixed to the hull 111. A second bearing bracket 125 is secured to the other hull 112. The pair-wise arranged gears 121 are provided with eccentric pins (not shown) which cause the undulator 126 to perform an orbiting movement and to direct an undulated stream of water alternatively against the opposed sides of a deundulator 127 which is mounted between the hulls 111, 112 downstream of the undulator. The deundulator may be adjusted toward and away from the trailing edge of the undulator 126 as well as angularly about an axis which is parallel with the shaft 119 in the same way as described in connection with FIG. 1. The parts 126, 127 are located at a level below the water surface.

Owing to the fact that the undulator 126 is mounted between the hulls 111, 112, the speed of the water stream which flows against its leading edge is greater than the forward speed of the catamaran 110. This will be readily understood since the speed of the water stream is increased owing to displacement which is produced by the hulls. This catamarin may be used as a tug to drag or to push barges in shallow waters. Its direction of forward movement is indicated by an arrow 128. A rudder (not shown) or a similar steering device may be provided to change the direction of the boat.

An important advantage of the boat shown in FIG. 10 is that it can operate in very shallow waters without any damage to the bed. The throw of eccentric pins on the gears 121 is comparatively small so that the undulator 126 need not necessarily descend to a level below the bottoms of the hulls 111, 112.

Figure 11:
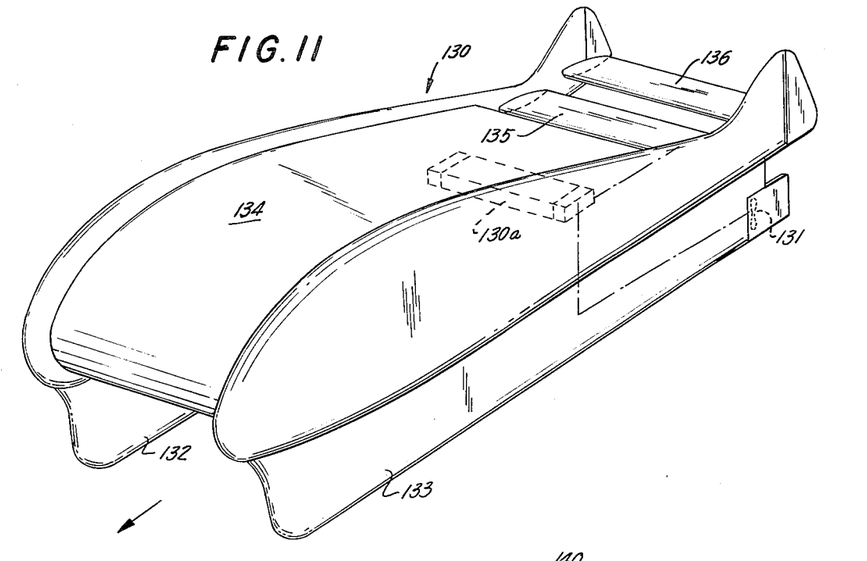
FIG. 11 is a perspective view of a flying boat which comprises a driving arrangement of the type shown in FIG. 8.

Referring to FIG. 11, there is shown a twin-hulled flying boat 130 which is provided with a power plant 130a including two underwater propellers 131 (only one shown). The hulls 132, 133 are connected by a wing 134 of considerable thickness so that the lifting action of the propellers 131 is very small because the flow of air along the surfaces of the wing 134 is interrupted owing to great thickness of the wing. This wing accommodates the passengers and the crew.

As soon as the power plant 130a has accelerated the boat 130 to a predetermined extent, the operator starts the driving arrangement which includes an undulator 135 and a deundulator 136, both mounted between the hulls 132, 133 in the rear portion of the boat. The undulator 135 may be driven by the power plant 130a or by a separate power plant and is located in the path of the air stream which flows along the wing 134. The undulator 135 causes the stream of air to flow along the wing which increases the lift effect to such an extent that the boat rises above the water surface and flies in air. Thus, the wing 134 cooperates with the undulator 135 to lift the boat above the water surface, and the propulsive thrust is increased because the stream of air which is undulated by the member 135 impinges against the opposed sides of the deundulator 136 so that the boat may attain a high speed.

During landing, the power plant 130a continues to orbit the undulator 135 but the deundulator 136 is turned almost vertically downwardly to insure that the boat may land at very low speed. The buoyance of the wing 134 is especially high when the deundulator is pivoted to a substantially vertical position, and this enables the craft to land while flying at very low speed.

An important advantage of the boat 130 over all such types of hydrofoils and similar flying watercraft of which I have knowledge at this time is that the members 135, 136 need not be located at a level below the bottom surfaces of the hulls 132, 133 so that the boat is very shallow which reduces the resistance of water and insures that the boat may be accelerated very rapidly to the extent necessary to switch to operation with the driving arrangement including the members 135, 136.

The transmission which drives the undulator 135 is not shown in FIG. 11 because it is analogous to the transmission of FIG. 9 or 10.

Figure 12:
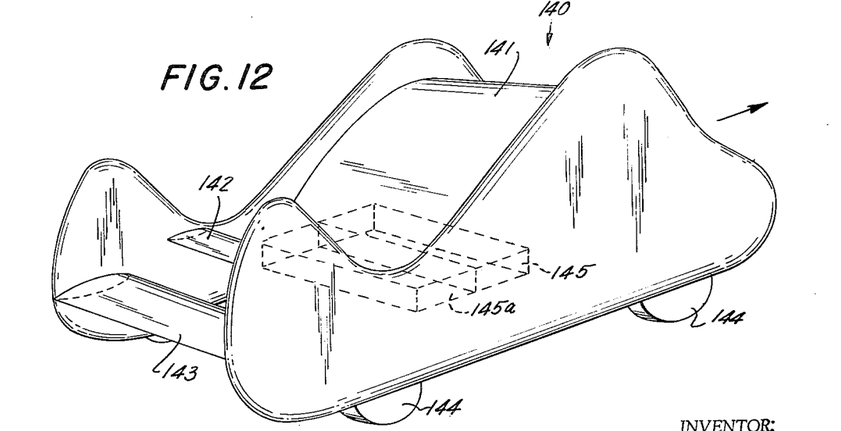
FIG. 12 is a perspective view of a flying automobile which is also equipped with a power plant of the type shown in FIG. 8.

FIG. 12 illustrates a flying road vehicle in the form of a twin hulled automobile 140 having a transversely extending wing 141 located in front of an undulator 142, and this undulator is located in front of a deundulator 143. The automobile is started in the customary way by an engine 145 which drives the wheels 144 and, once the automobile gains a certain speed, the engine 145 is connected with the undulator 142 which cooperates with the deundulator 143 to produce the necessary thrust during flight. The automobile of FIG. 12 may travel on normal roads and, when started on a suitable runway, will fly above ground in the same way as described in connection with FIG. 11. All that is necessary is to disconnect the engine 145 from the wheels 144 and to couple the engine with the undulator 142. The transmission which is driven by the engine 145 and which may orbit the undulator 142 is shown schematically at 145a.

Figures 13, 14, 15:
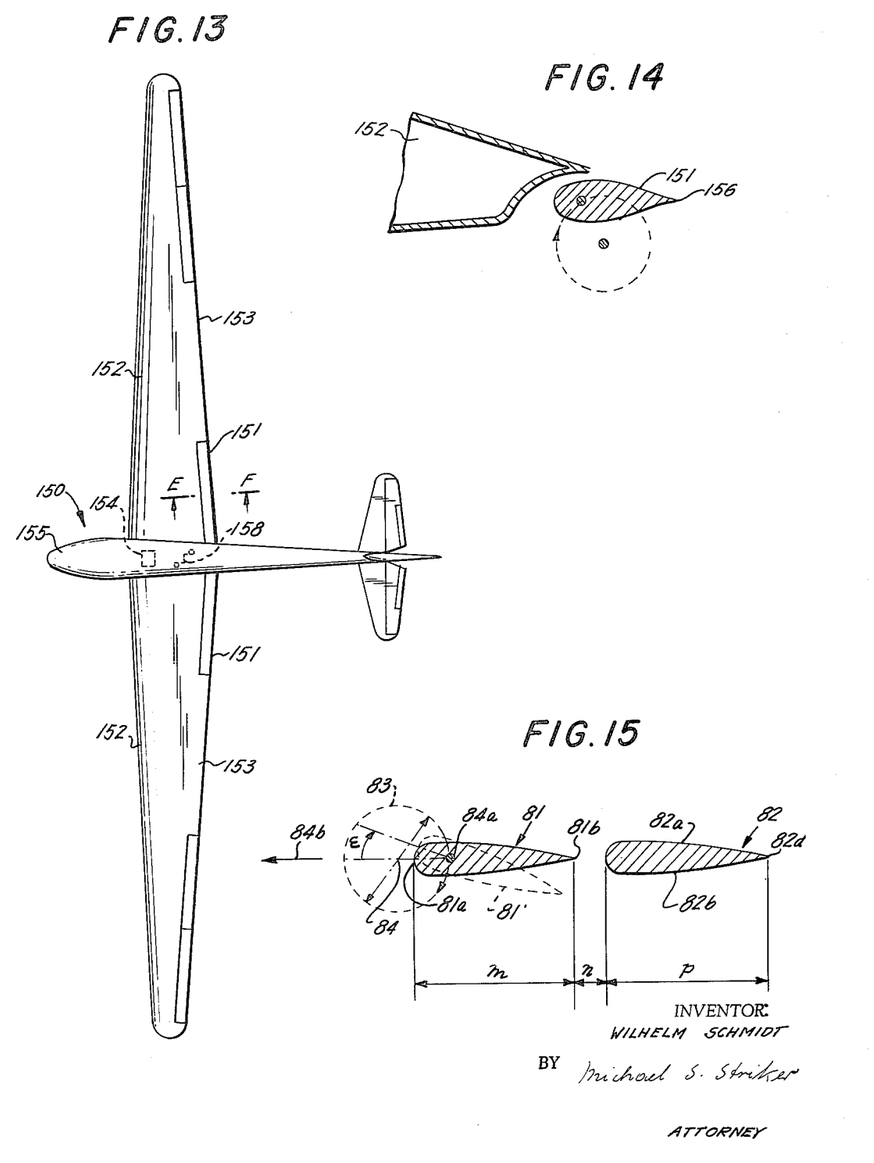
FIG. 13 is a top plan view of a glider which comprises an elementary driving arrangement including a series of undulators, a manually operated mechanism and a power plant both serving to orbit the undulators at the will of the pilot.
FIG. 14 is an enlarged schematic transverse section through one wing of the glider as seen in the direction of arrows from the line E–F of FIG. 13.
FIG. 15 is a section as seen in the direction of arrows from the line G–H in FIG. 8.

Referring now to FIG. 13, there is shown a glider 150 which is equipped with a driving arrangement including undulators 151, which are located at the trailing edges 153 of the wings 152. The undulators may be driven by a small auxiliary engine 154 which will normally be started only when the air currents are unsatisfactory. The undulators 151 which are close to the hull 155 also serve as landing flaps. The manner in which the undulators may orbit with reference to the wings 152 is shown diagrammatically in FIG. 14. When the undulators are idle, they are flush with the wings so that their trailing edges 156 are aligned with the trailing edges 153. This is of advantage because the undulators do not interfere with the flow of air along the wings.

When the pilot starts the engine 154 to orbit the undulators 151, the undulators improve the lift action of the wings and produce a propulsive thrust. Thus, the glider may remain in air for very long periods of time and is less dependent on air curents. If desired, the undulators 151 may be driven by muscle power through a suitable crank mechanism 158.

Of course, the glider of FIGS. 13 and 14 may be modified by providing several deundulators in the manner as shown in FIG. 4 or 6 but without any jet power plants. Actually, the tail fins 157 constitute two deundulators for the wavy fluid streams which are produced by the undulators 151.

The section of FIG. 15 illustrates a portion of a driving arrangement which comprises the undulator 81, the deundulator 82, and rotary drive means (such as the disk-shaped member 4 of FIG. 1) for orbiting the undulator 81 about the axis 84 in such a way that the undulator normally remains parallel with itself and that it produces in a fluid medium an undulated fluid stream which impinges alternatively against the sides 82a, 82b. The distance between the axis 84a about which the undulator 81 rotates and the leading edge 81a is assumed to equal one-fourth of the depth of the undulator, i.e., one-fourth of the distance $m$ between the leading edge 81a and the trailing edge 81b. The undulator 81 may change its angular position with reference to the axis 84a by pivoting in a clockwise or counterclockwise direction. Also, the undulator 81 may be adjusted in parallelism with the direction of propulsion (arrow 84b) so as to vary the distance $n$ between the trailing edge 81b and the leading edge 82c of the deundulator 82. The same result may be achieved if the deundulator 82 is movable toward and away from the trailing edge 81b.

If the deundulator 82 (having a depth $p$) is replaced by a deundulator with a different depth $p$, the forward speed of the conveyance in which the driving arrangement is used will increase to a certain point and thereupon begins to decrease. For example, (the propulsive thrust will be very satisfactory if $m=p$ and $n=m/6$. Such propulsive thrust will be less if $p \neq m$. It was found that a deundulator (positioned at a proper distance from and having a depth which is in proper relationship to the depth of the undulator) will improve the efficiency of the driving arrangement by 50–90 percent.

If the speed at which the undulator 81 orbits in a clockwise direction is changed, the forward speed of the driving arrangement increases with increasing speed about the axis 84.

It was further found that the undulator 81 produces a downwardly directed undulated fluid stream if the plane passing through its edges 81a, 81b also passes through the edges 82c, 82d of the deundulator 82. If the undulator is adjusted through an angle $\epsilon = -20°$, the undulated stream will flow counter to the direction 84b and the thrust increases.

In summation, it can be said that, while the orbiting deundulator by itself produces a propulsive thrust which can drive a vehicle, such thrust is increased considerably if the driving arrangement comprises a deundulator whose depth is in a predetermined relationship with the depth of the undulator.

Without further analysis, the foregoing will so fully reveal the gist of the present inveintion that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A driving arrangement for conveyances of the type propelled in a fluid medium by at least one fluid stream which moves with respect to the fluid medium, comprising wing means having trailing edge means; power plant means arranged to produce at least one fluid stream and having nozzle means located close to said trailing edge means and arranged to discharge said one fluid stream in a predetermined direction so as to drive the conveyance in a direction counter to said predetermined direction; undulator means arranged to undulate said one fluid stream whereby the propulsive thrust of the driving arrangement increases; and deundulator means located downstream of said undulator means and at least partially in the path of the undulated fluid stream, said deundulator means having a pair of substantially opposed sides against which the undulated fluid stream impinges alternatively whereby the fluid stream is deundulated and the propulsive thrust of the driving arrangement increases.

2. A driving arrangement for conveyances of the type propelled in a fluid medium by at least one fluid stream which moves with respect to the fluid medium, comprising wing means having trailing edges means; power plant means arranged to produce at least one fluid stream and having nozzle means located close to said trailing edge means and arranged to discharge said one fluid stream in a predetermined direction so as to drive the conveyance in a direction counter to said predetermined direction; undulator means arranged to undulate said one fluid stream whereby the propulsive thrust of the driving arrangement increases; and deundulator means located downstream of said undulator means and at least partially in the path of the undulated fluid stream, said deundulator means having a pair of substantially opposed sides against which the undulated fluid stream impinges alternatively whereby the fluid stream is deundulated to flow in said predetermined direction and the propulsive thrust of the driving arrangement increases.

3. A driving arrangement for conveyances of the type propelled in a fluid medium by at least one fluid stream which moves with respect to the fluid medium, comprising wing means having trailing edge means; power plant means arranged to produce at least one fluid stream and located close to said wing means, said power plant means having nozzle means including substantially slit-shaped orifice means extending in the longitudinal direction of said trailing edge means and arranged to discharge said one fluid stream in a predetermined direction so as to drive the conveyance in a direction counter to said predetermined direction; undulator means arranged to undulate said one fluid stream at a point close to said slit-shaped orifice means whereby the propulsive thrust of the driving arrangement increases; and deundulator means located downstream of said undulator means at least partially in the path of the undulated fluid stream, said deundulator means having a pair of substantially opposed sides against which the undulated fluid stream impinges alternatively whereby the fluid stream is deundulated and the propulsive thrust of the driving arrangement increases.

4. A driving arrangement for conveyances of the type propelled in a fluid medium by at least one fluid stream which moves with respect to the fluid medium, comprising wing means having trailing edge means and recess means extending forwardly of said trailing edge means; power plant means arranged to produce at least one fluid stream and mounted in said wing means forwardly of said recess means, said power plant means comprising nozzle means arranged to discharge said one fluid stream into said recess means so that the fluid stream flows in a predetermined direction and drives the conveyance in a direction counter to said predetermined direction; undulator means provided in said recess means an arranged to undulate the fluid stream whereby the propulsive thrust of the driving arrangement increases; and deundulator means located in said recess means downstream of said undulator means and at least partially in the path of the undulated fluid stream, said deundulator means having a pair of substantially opposed sides against which the undulated fluid stream impinges alternatively whereby the fluid stream is deundulated and the propulsive thrust of the driving arrangement increases.

5. A driving arrangement for conveyances of the type propelled in a fluid medium by at least one fluid stream which moves with respect to the fluid medium, comprising wing means having trailing edge means and recess means extending forwardly of said trailing edge means; power plant means arranged to produce at least one fluid stream and mounted in said wing means forwardly of said recess means, said power plant means comprising nozzle means arranged to discharge said one fluid stream into said recess means so that the fluid stream flows in a predetermined direction and drives the conveyance in a direction counter to said predetermined direction; undulator means provided in said recess means and arranged to orbit about an axis which is substantially perpendicular to said predetermined direction while remaining substantially parallel with itself so as to undulate the fluid stream whereby the propulsive thrust of the driving arrangement increases; transmission means driven by said power plant means and arranged to orbit the undulator means about said axis; and deundulator means located in said recess means downstream of said undulator means and at least partially in the path of the undulated fluid stream, said deundulator means having a pair of substantially opposed sides against which the undulated fluid stream impinges alternatively whereby the fluid stream is deundulated and the propulsive thrust of the driving arrangement increases.

6. A driving arrangement as set forth in claim 5, wherein said power plant means comprises at least one jet power plant, said jet power plant comprising a shaft drivingly connected with said transmission means.

7. A driving arrangement as set forth in claim 5, wherein said transmission means comprises at least one variable-speed transmission and means for varying the speed ratio of said transmission.

8. A driving arrangement for conveyances of the type propelled in a fluid medium by at least one fluid stream which moves with respect to the fluid medium, comprising wing means having trailing edge means; power plant means arranged to produce at least one fluid stream and having nozzle means located close to said trailing edge means and arranged to discharge said one fluid stream in a predetermined direction so as to drive the conveyance in a direction counter to said predetermined direction; undulator means of airfoil profile arranged to undulate said one fluid stream whereby the propulsive thrust of the driving arrangement increases; deundulator means of airfoil profile located downstream of said undulator means and at least partially in the path of the undulated fluid stream, said deundulator means having a leading edge which is substantially perpendicular to said predetermined direction and substantially opposed sides against which the undulated fluid stream impinges alternatively whereby the fluid stream is deundulated and the propulsive thrust of the driving arrangement increases; and adjusting means for pivoting said deundulator means about an axis which is perpendicular to said predetermined direction whereby the deundulator means may alter the direction of the fluid stream.

9. A driving arrangement for conveyances of the type propelled in a fluid medium by at least one fluid stream which moves with respect to the fluid medium, comprising wing means having trailing edge means; power plant means arranged to produce at least one fluid stream and having nozzle means located close to said trailing edge means and arranged to discharge said one fluid stream in a predetermined direction so as to drive the conveyance in a direction counter to said predetermined direction; undulator means arranged to undulate said one fluid stream whereby the propulsive thrust of the driving arrangement increases; deundulator means of airfoil profile located downstream of said undulator means and at least partially in the path of the undulated fluid stream, said deundulator means having elongated leading edge means extending at right angles with reference to said predetermined direction and a pair of substantially opposed sides against which the undulated fluid stream impinges alternatively whereby the fluid stream is deundulated and the propulsive thrust of the driving arrangement increases; and adjustable side rudder means adjacent to the ends of said leading edge means to steer the conveyance.

10. A driving arrangement for conveyances of the type propelled in a fluid medium by at least one fluid stream which moves with respect to the fluid medium and whose speed approximates the forward speed of the conveyance, comprising wing means having trailing edge means; power plant means arranged to produce at least one fluid stream and having nozzle means located close to said trailing edge means and arranged to discharge said one fluid stream in a predetermined direction so as to drive the conveyance in a direction counter to said predetermined direction; undulator means arranged to undulate said one fluid stream whereby the propulsive thrust of the driving arrangement increases; and deundulator means located downstream of said undulator means and at least partially in the path of the undulated fluid stream, said deundulator means having a pair of substantially opposed sides against which the undulated fluid stream impinges alternatively whereby the fluid stream is deundulated and the propulsive thrust of the driving arrangement increases.

11. In a jet propelled conveyance, in combination, wing means having trailing edge means; power plant means arranged to produce at least one fluid stream and mounted in said wing means forwardly of said trailing edge means, said power plant means comprising nozzle means having orifice means located close to said trailing edge means and arranged to discharge said one fluid stream in a predetermined direction and to drive the conveyance in a direction counter to said predetermined direction; undulator means of airfoil profile arranged to orbit in said fluid stream so as to undulate the fluid stream whereby the propulsive thrust of the driving arrangement increases; and deundulator means of airfoil profile located downstream of said undulator means and at least partially in said undulated fluid stream, said deundulator means having a pair of substantially opposed sides against which the undulated fluid stream impinges alternatively whereby the fluid stream is deundulated and the propulsive thrust increases.

12. A combination as set forth in claim 11, further comprising transmission means driven by said power plant means and arranged to orbit said undulator means in parallelism with itself and about an axis which is substantially perpendicular to said predetermined direction.

13. A combination as set forth in claim 12, further comprising carrier means for said undulator means and said deundulator means, said carrier means extending forwardly along the upper side and along the underside of said wing means and located at the opposite sides of said power plant means.

14. A combination as set forth in claim 12, wherein said transmission means is accommodated in the interior of said wing means.

15. A combination as set forth in claim 11, wherein said undulator means comprises a trailing edge and a portion adjacent to said trailing edge which is swingable about an axis substantially perpendicular to said predetermined direction to serve as a deflector for the fluid stream.

16. A combination as set forth in claim 15, wherein said portion of the undulator means comprises a plurality of ailerons and further comprising control means arranged to pivot said ailerons about said axis.

17. In a jet propelled conveyance, in combination, wing means having trailing edge means; power plant means arranged to produce a plurality of fluid streams and mounted in said wing means forwardly of said trailing edge means, said power plant means comprising nozzle means having orifice means located in the proximity of said trailing edge means and arranged to discharge said fluid streams in a predetermined direction so as to drive the conveyance in a direction counter to said predetermined direction; undulator means arranged to orbit in said fluid streams so as to undulate the fluid streams whereby the propulsive thrust of the driving arrangement increases; and deundulator means for airfoil profile located downstream of said undulator means and at least partially in the path of the undulated fluid streams, said deundulator means having substantially opposed sides against which the undulated fluid streams impinge alternatively whereby the fluid streams are deundulated and the propulsive thust increases.

18. A combination as set forth in claim 17, wherein said orifice means comprises a plurality of elongated slits which extend along a substantial portion of said trailing edge means.

19. In a jet propelled conveyance, in combination, wing means having leading edge means and trailing edge means; a plurality of power plants arranged to produce individual fluid streams and mounted in said wing means in the proximity of said leading edge means; a single nozzle located in the proximity of said trailing edge means and having an exhaust orifice; conduit means arranged to conduct the individual fluid streams to said nozzle so that said orifice discharges a single fluid stream in a predetermined direction to drive the conveyance in a direction counter to said predetermined direction; undulator means arranged to orbit in said single fluid stream so as to undulate the single fluid stream whereby the propulsive thrust increases; and deundulator means of airfoil profile located downstream of said undulator means and at least partially in the path of the undulated fluid stream, said deundulator means having substantially opposed sides against which the undulated fluid stream impinges alternatively whereby the fluid stream is deundulated and the propulsive thrust increases.

20. In a jet propelled conveyance, in combination, wing means having trailing edge means; a plurality of power plants each arranged to produce a separate fluid stream and each mounted in said wing means, said power plants having nozzles with orifices located in the proximity of said trailing edge means to discharge the respective fluid streams in a predetermined direction and to drive the conveyance in a direction counter to said predetermined direction; a plurality of undulators, at least one for each of said power plants, said undulators being arranged to orbit in the respective fluid streams so as to undulate the fluid streams whereby the propulsive thrust increases; and a plurality of deundulators of airfoil profile, at least one for each power plant, said deundulators being located downstream of the respective undulators and at least partially in the path of the respective undulated fluid streams, each of said undulators having opposed sides against which the respective undulated fluid streams impinge alternatively whereby the fluid streams are deundulated and the propulsive thrust increases.

21. A driving arrangement for conveyances of the type propelled in a fluid medium by fluid streams which move with respect to the fluid medium, comprising wing means having trailing edge means; power plant means arranged to produce at least one fluid stream and located close to said wing means, said power plant means having nozzle means located close to said trailing edge means and arranged to discharge said one fluid stream in a predetermined direction so as to drive the conveyance in a direction counter to said predetermined direction; and undulator means arranged to undulate said one fluid stream whereby the propulsive thrust of the driving arrangement increases.

22. A driving arrangement for conveyances of the type propelled in a fluid medium by fluid streams which move with respect to the fluid medium, comprising an undulator located in the fluid medium and arranged to orbit about an axis which is substantially perpendicular to the direction of intended propulsion; power plant means operatively connected with and arranged to orbit said undulator means so that the undulator means by itself produces in said medium an undulated fluid stream which flows in a direction substantially counter to the direction of propulsion; and deundulator means located downstream of said undulator means and at least partially in the path of the undulated fluid stream, said denundulator means having a pair of substantially opposed sides against which the undulated fluid stream impinges alternatively whereby the fluid stream is deundulated and the propulsive thrust of the driving arrangement increases.

23. A driving arrangement for conveyances of the type propelled in a fluid medium by fluid streams which move with respect to the fluid medium, comprising an undulator located in and arranged to move with respect to the fluid medium in a predetermined path and to thereby produces by itself an undulated fluid stream which flows with respect to the fluid medium in a direction substantially counter to the direction of intended propulsion; means for moving the undulator in said predetermined path; and a deundulator located downstream of said undulator and having sides which are alternatively swept by the undulated fluid stream whereby the fluid stream is deundulated and the propulsive thrust of the driving arrangement increases.

24. A watercraft comprising a hull; and an outboard driving arrangement including an undulator located at a level below the water surface and extending transversely of and located astern of the hull, said undulator being arranged to orbit in water in parallelism with itself about a horizontal axis which is perpendicular to the direction of propulsion, and means for orbiting said undulator about said axis whereby the undulator produces in water an undulated stream to drive the watercraft.

25. A watercraft as set forth in claim 24, further comprising supporting means for said driving arrangement, said supporting means being secured to the stern portion of said hull and being arranged to pivot with said undulator about a vertical pivot axis to steer the watercraft.

26. A watercraft comprising a pair of spaced hulls; and a driving arrangement including an elongated undulator disposed below the level of the water surface and extending transversely between said hulls, and means for orbiting said undulator in water about an axis which is parallel with the longitudinal extension thereof whereby the undulator produces an undulated water stream to drive the watercraft.

27. A watercraft comprising a pair of spaced hulls; and a driving arrangement including an elongated undulator disposed below the level of the water surface and extending transversely between said hulls; means for orbiting said undulator in water about an axis which is parallel with the longitudinal extension thereof whereby the undulator produces an undulated water stream to drive the watercraft, and a deundulator secured to at least one of said hulls and located below the level of the water surface downstream of said undulator, said deundulator having a pair of opposed sides against which the undulated water stream impinges alternatively and is deundulated whereby the propulsive thrust of the driving arrangement increases.

28. A flying boat, comprising a wing extending transversely of the direction of propulsion; propeller means arranged to accelerate the boat in water so that the boat attains a predetermined speed which is sufficient to enable the wing to lift it above the water surface; and a driving arrangement including an undulator located downstream of said wing above the level of the water surface at least at such times when the boat attains said predetermined speed whereby the undulator is located in the air stream which flows past the wing at said predetermined speed of the boat, said undulator being arranged to orbit in said air stream about an axis which is perpendicular to the direction of the air stream, and means for orbiting said undulator about said axis whereby the undulator undulates the air stream and increases the propulsive thrust of the driving arrangement.

29. A flying boat, comprising a wing extending transversely of the direction of propulsion; propeller means arranged to accelerate the boat in water so that the boat attains a predetermined speed which is sufficient to enable the wing to lift it above the water surface; and a driving arrangement including an undulator located downstream of said wing above the level of the water surface at least at such times when the boat attains said predetermined speed whereby the undulator is located in the air stream which flows past the wing at said predetermined speed of the boat, said undulator being arranged to orbit in said air stream about an axis which is perpendicular to the direction of the air stream, means for orbiting said undulator about said axis whereby the undulator undulates the air stream and increases the propulsive thrust of the driving arrangement, and a deundulator located in the undulated fluid stream and having a pair of sides against which the undulated fluid stream impinges alternatively whereby the propulsive thrust of the driving arrangement increases.

30. A flying boat as set forth in claim 29, wherein the means for orbiting said undulator is arranged to drive said propeller means while the boat is being accelerated to said predetermined speed.

31. A flying automobile, comprising a wheel-mounted wing extending transversely of the direction of intended propulsion; an engine arranged to drive the wheels so as to accelerate the automobile to a predetermined speed at which the wing lifts the automobile above the ground; and a driving arrangement including an undulator located downstream of the wing and arranged to orbit in the air stream which develops when the automobile travels at said predetermined speed, and means for orbiting said undulator about an axis which is perpendicular to the direction of the air stream whereby the undulator undulates the air stream and increases the propulsive thrust upon the automobile.

32. An automobile as set forth in claim 31, wherein the means for orbiting said undulator comprises a transmission which is driven by said engine.

33. An automobile as set forth in claim 31, further comprising a deundulator located in the undulated air stream and having a pair of sides against which the air stream impinges alternatively whereby the propulsive thrust of said driving arrangement increases.

34. A glider comprising a hull; a pair of wings extending laterally from said hull, each of said wings having a trailing edge; and a driving arrangement including an undulator for each of said wings, said undulators being mounted on the respective wings in parallelism with and in the proximity of the respective trailing edges and each thereof being arranged to orbit about an axis which is substantally parallel with the longitudinal extension of the respective wing, and means for orbiting said undulators about said axes whereby the undulators transform the air streams flowing past the wings into undulated air streams and produce propulsive thrusts which propel the glider in air.

35. A glider as set forth in claim 34, wherein the means for orbiting said undulators comprises an engine.

36. A glider as set forth in claim 34, wherein the means for orbiting said undulators comprises a manually operated mechanism.

37. A glider as set forth in claim 34, further comprising at least one additional undulator for each of said wings.

38. A method of propelling a conveyance in a fluid medium, comprising the steps of placing into the fluid medium a body of air foil profile; orbiting said body about an axis which is substantially parallel with the leading edge thereof and which is perpendicular to the direction of intended propulsion whereby said body by itself produces an undulated fluid stream which flows in a direction counter to the direction of intended propulsion and causes the conveyance to move in said fluid medium; and placing a second body of airfoil profile into the undulated fluid stream in such a way that the leading edge of the second body is perpendicular to the direction of propulsion and that the undulated fluid stream alternatively impinges against different sides of said second body whereby the fluid stream is deundulated and the propulsive thrust increases.

39. A method of propelling a conveyance in a fluid medium, comprising the steps of placing into the fluid medium a body of airfoil profile; orbiting said body in parallelism with itself about an axis which is parallel with the leading edge thereof and which is perpendicular to the direction of intended propulsion whereby said body by itself produces an undulated fluid stream which flows in a direction counter to the direction of intended propulsion and causes the conveyance to move in the fluid medium; and placing a second body of airfoil profile into the undulated fluid stream in such a way that the leading edge of the second body is substantially perpendicular to the direction of intended propulsion and that the undulated fluid stream alternatively impinges against different sides of said second body whereby the fluid stream is deundulated and the propulsive thrust increases.

40. A method of propelling a conveyance in a fluid medium, comprising the steps of producing in the fluid medium a straight fluid stream which flows in a direction counter to the direction of intended propulsion whereby the fluid stream causes the conveyance to move in the fluid medium; placing into the fluid stream a body of airfoil profile; and orbiting said body about an axis which is perpendicular to the direction of intended propulsion and which is substantially parallel with the leading edge thereof whereby said body transforms the straight fluid stream into an undulated fluid stream whose propulsive thrust is higher than the thrust of the straight fluid stream.

41. In a conveyance of the type which is propelled in a fluid medium, in combination, a load-receiving body structure; and a driving arrangement comprising an undulator supported by said body structure, means for orbiting said undulator about an axis which is substantially perpendicular to the direction of intended propulsion so that said undulator produces in the fluid medium an undulator fluid stream which flows in a direction counter to the direcion of intended propulsion and causes the conveyance to move in the fluid medium; and a deundulator located downstream of said undulator and arranged to deundulate and to thereby increase the propulsive thrust of said fluid stream.

42. A structure as set forth in claim 41, wherein said body structure comprises a wing having a trailing edge located upstream of said undulator.

43. A structure as set forth in claim 41, wherein said body structure comprises a wing and wherein said undulator is received in a recess provided in the trailing edge of said wing.

44. A structure as set forth in claim 41, wherein said undulator is arranged to orbit about a horizontal axis and wherein said deundulator is a body of airfoil profile having a horizontal leading edge.

45. A structure as set forth in claim 41, wherein said conveyance is a boat and wherein said body structure is the hull of said boat, said hull having a flat bottom and said undulator being located astern of the hull and being arranged to orbit about a horizontal axis.

46. A structure as set forth in claim 41, wherein said conveyance is a twin-hulled combination air- and watercraft and wherein said undulator is located between the hulls and above the water level, said body structure comprising a wing upstream of said undulator.

47. A structure as set forth in claim 41, wherein said conveyance is a combination aircraft and road vehicle and wherein said body structure comprises a wing located upstream of said undulator.

48. A structure as set forth in claim 41, wherein said conveyance is a sled and wherein said body structure comprises a wing located upstream of said undulator.

49. A structure as set forth in claim 41, wherein said conveyance is an aircraft and wherein said body structure comprises a wing having a leading edge located upstream of said undulator.

50. A structure as set forth in claim 41, wherein said conveyance is a glider and wherein said body structure comprises a wing having a leading edge located upstream of said undulator.

51. A watercraft comprising a hull: and an outboard driving arrangement including an undulator of airfoil profile located at a level below the water surface and extending transversely of and located astern of the hull, said undulator being arranged to orbit in water about a horizontal axis which is perpendicular to the direction of propulsion and said undulator having a leading edge which is parallel with said axis, means for orbiting said undulator about said axis, and means for normally maintaining said undulator in parallelism with itself while the undulator orbits about said axis whereby said undulator produces in water an undulated stream to drive the watercraft.

References Cited by the Examiner
UNITED STATES PATENTS

| | | | |
|---|---|---|---|
| 570,613 | 11/96 | Smith | 115—18 |
| 1,740,820 | 12/29 | Kirsten | 115—52 |
| 2,996,034 | 8/61 | Jonsson. | |
| 3,027,863 | 4/62 | Town | 115—49 X |
| 3,068,642 | 12/62 | Schmidt | 60—35.5 |
| 3,111,928 | 11/63 | Schmidt | 244—62 |

MILTON BUCHLER, *Primary Examiner.*

ANDREW H. FARRELL, FERGUS S. MIDDLETON,
*Examiners.*